Figure 1:
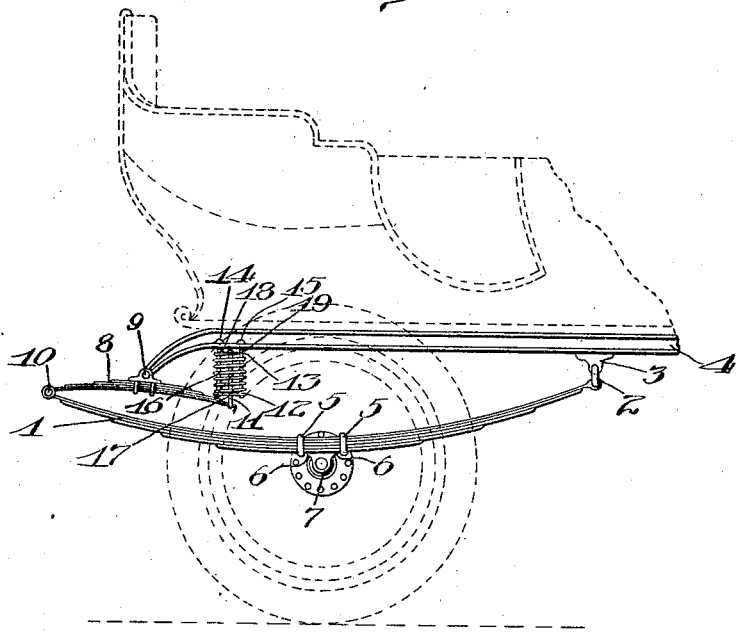

No. 869,968. PATENTED NOV. 5, 1907.
E. J. JENNESS.
SPRING SUSPENSION FOR AUTOMOBILES.
APPLICATION FILED JAN. 18, 1906.

UNITED STATES PATENT OFFICE.

EDWIN J. JENNESS, OF CHICAGO, ILLINOIS.

SPRING-SUSPENSION FOR AUTOMOBILES.

No. 869,968.  Specification of Letters Patent.  Patented Nov. 5, 1907.

Application filed January 18, 1906. Serial No. 296,701.

*To all whom it may concern:*

Be it known that I, EDWIN J. JENNESS, a citizen of the United States, residing at Chicago, in the county of Cook and State of Illinois, have invented new and useful Improvements in Spring-Suspension for Automobiles and other Vehicles, of which the following is a full, clear, concise, and exact description, reference being had to the accompanying drawing, forming a part of this specification.

This invention relates to improvements in spring suspension for automobiles and other vehicles, and contemplates the use of simple and efficient means to prevent too great distention of the supporting spring of a vehicle body under load or extraordinary jars, and to aid in absorbing the shocks of travel, and to control the action of the supporting spring to restrain and delay its tendency to resume its normal position after a depression thereof.

For a full description of the invention and the merits thereof, and also to acquire a knowledge of the details of construction of the means for effecting the results, reference is to be had to the following description and accompanying drawings.

Corresponding and like parts are referred to in the following description and indicated in the drawings by the same reference characters.

Figure 2:
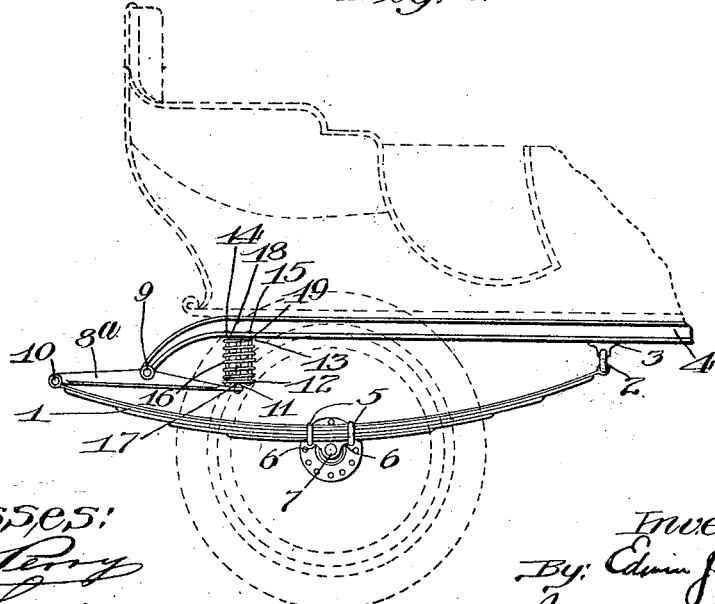

While the essential and characteristic features of the invention are susceptible of modification, still the preferred embodiment of the invention is illustrated in the accompanying drawings in which:

Figure 1 is an elevation partly in cross-section showing the arrangement of the parts comprising the spring suspension; and. Fig. 2 is similar to Fig. 1, showing a modification.

Referring to the drawings, 1 designates an ordinary leaf spring 2 is a link pivotally connected both to one end of the leaf spring 1 and to a bracket 3 which is secured to the longitudinal side 4 of the under frame of the automobile or other vehicle. Clips 5 secure the said leaf spring 1 to the integral lugs 6, 6, of the transverse member 7 of the under frame. The rear of the longitudinal side 4 of the under frame is bent downward and from its end 9 a lever 8 is pivotally suspended at substantially its middle point.

Fig. 1 shows the lever in the form of the leaf spring structure, while in Fig. 2 a rigid structure for the lever is shown. One end of the lever 8 is pivotally secured by suitable means to the end 10 of the leaf spring 1 and the other end of the lever 8 is secured to a bolt 11 which in turn is secured to a cross-head 13. Bolts or standards 14, 15 depending from the longitudinal side of the under frame 4 have secured thereto, the cross-head 12 and pass freely through openings 18, 19 in the cross-head 13. An opening 17 in the cross-head 12 permits a free movement of the bolt 11 therethrough. A coil spring 16 is secured by suitable means to the cross heads 12 and 13, and acts to normally press the head of the bolt 11 secured to cross head 13 against the underside of the longitudinal side 4 of the under frame.

It is obvious that the spring suspension herein set forth operates to prevent great distention of the leaf spring 1 under load, and serves to absorb shocks of travel and restrains and delays the tendency of the leaf spring 1 to resume its normal position after any depression thereof.

Having thus described my invention what I claim as new and desire to secure by Letters Patent is:

1. A spring-suspension for vehicles comprising, in combination, a supporting spring connected at one end to the body of the vehicle and at an intermediate point connected to the running gear, a lever pivoted at an intermediate point to the body of the vehicle and at one end connected with the opposite end of said supporting spring, a second spring secured to the vehicle, and means carried by the other end of said lever and projecting vertically upwards to engage said second spring, whereby the downward movement of said other end of the lever is opposed by the action of said second spring.

2. A spring-suspension for vehicles comprising, in combination, a supporting spring connected at one end to the body of the vehicle and at an intermediate point connected to the running gear, a resilient lever pivoted at an intermediate point to the body of the vehicle and at one end connected with the opposite end of said supporting spring, a second spring secured to the vehicle, and means carried by the other end of said lever and projecting vertically upwards to engage said second spring, whereby the downward movement of said other end of the lever is opposed by the action of said second spring.

In witness whereof, I have hereunto subscribed my name in the presence of two witnesses.

EDWIN J. JENNESS.

Witnesses:
W. PERRY HAHN,
E. R. KING.